Oct. 15, 1940.  J. W. TAYLOR  2,218,366
MELTING TANK
Filed May 10, 1939
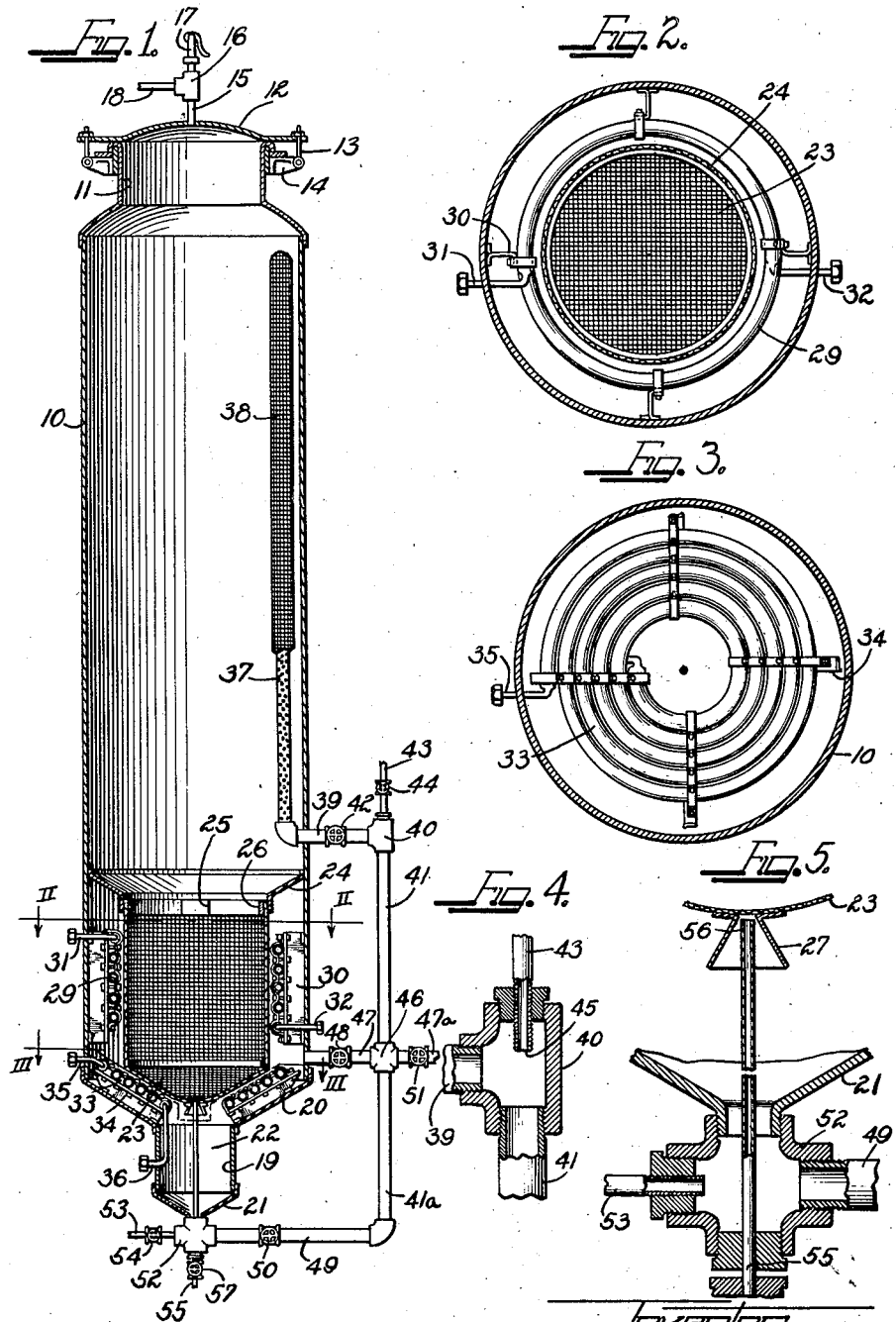
Inventor
JAMES W. TAYLOR

UNITED STATES PATENT OFFICE 2,218,366

MELTING TANK

James W. Taylor, Pensacola, Fla., assignor to Peninsular-Lurton Company, Pensacola, Fla., a corporation of Florida Application May 10, 1939, Serial No. 272,745

12 Claims. (Cl. 210—49.6)

This invention relates to a melting tank and more particularly to a tank for melting down oleoresins or other resinous material, and the like.

It is an object of the present invention to provide a tank in which strainer means are positioned in the upper portion of the tank for the withdrawal therefrom of molten portions of the charge and a steam jet associated therewith for heating and recirculating such withdrawn molten portions through the unmelted portion of the charge to aid in the melting thereof and increase the rapidity with which the entire charge is brought to a molten state.

It is a further important object of this invention to provide a melting tank having a perforated baffle member for supporting the charge of material to be melted, with indirect and direct steam heating means so arranged with respect to said perforated baffle as to effect a rapid heating and circulation of molten portions of the charge upwardly through the baffle into the unmelted portion of the charge supported thereabove.

Other and further important objects of this invention will be apparent from the disclosures in the specification and the accompanying drawing.

This invention (in a preferred form) is illustrated in the drawing and hereinafter more fully described.

On the drawing:

Figure 1 is a vertical sectional view of a melting tank embodying the principles of my invention, with parts shown in elevation.

Figure 2 is an enlarged sectional view taken substantially on the line II—II of Fig. 1.

Figure 3 is an enlarged sectional view taken substantially on the line III—III of Fig. 1.

Figure 4 is a fragmentary enlarged sectional view of the steam jet associated with the filtrate line from the strainer.

Figure 5 is an enlarged broken and fragmentary sectional view of the bottom fitting and lower steam jet assembly.

As shown on the drawing:

The reference numeral 10 indicates an elongated cylindrical tank having an upper reduced neck 11 provided with a removable head 12, through which the tank is charged with the material, such as oleoresin, to be melted. Said head 12 is adapted to be clamped in place by means of swinging bolts 13 carried by projecting ears 14 secured to said neck 11. A pipe 15 extends through said head and is provided with a T fitting 16, on the top of which is mounted a relief valve 17, and into the side of which extends a steam pipe 18.

The lower end of said tank 10 is provided with a reduced cylindrical portion 19 which is secured to the cylindrical body of the tank by means of a convergent bottom wall 20. The lower end of said reduced cylindrical portion 19 is enclosed by a convergent bottom wall 21 to form a sump chamber 22 at the bottom of said tank 10. The various wall portions of the tank may be suitably secured together, as by welding, riveting or the like.

Near the bottom of the tank 10 there is positioned a perforated basket 23, removably supported in spaced relation to the walls of the tank by an upper annular baffle 24 secured to the inner cylindrical wall of the tank and having a cylindrical flange engaging said basket. In order to facilitate the removal of said basket, ears 25 are provided that project inwardly from the upper neck band 26 of the basket.

The basket itself may be formed of suitable foraminous material, such as wire mesh, the wire of which has a gauge of 0.080 inch and the openings of which are about $\frac{1}{8}$ inch square. The basket is of generally cylindrical shape with a downwardly convergent bottom that is spaced from and substantially concentric with the convergent bottom wall 20 of the tank. To the very bottom of said basket 23, centrally thereof, is secured an inverted funnel-shaped member 27, which may suitably be formed of sheet metal and which serves a function later to be described.

A helical steam coil 29 is supported from vertical brackets 30 between the spaced cylindrical walls of the tank 10 and basket 23. Said coil 29 is provided with an upper steam inlet 31 and a lower stream and condensate outlet 32. A second steam coil 33 is mounted from the convergent wall 20 of the tank upon brackets 34 secured to said wall 20. The lower conical wall of the basket 23 rests upon and is supported by said coil 33. An upper steam inlet 35 admits steam to said steam coil 33 and the condensate is removed therefrom through a lower outlet 36.

An elongated strainer pipe 37 extends for substantially the full length of the tank 10 above the baffle 24 in slightly spaced relation to the inner cylindrical wall of the tank. Suitable filtering material 38 covers the length of strainer pipe 37. The lower end of said strainer pipe 37 is connected to a short length of piping 39 that extends through the tank wall and is joined by a T fitting 40 with a vertical length of pipe 41. A valve 42 is positioned in the length of pipe 39. A steam pipe 43 having a controlling valve 44 is threaded into the upper branch of the fitting 40 to provide a jet orifice 45 within said fitting 40 at a point about opposite to the opening of the pipe 39 into said fitting.

The vertical length of pipe 41 extends into a cross fitting 46, to one horizontal branch of which is joined a pipe 47 having a valve 48 and opening into the tank 10 at a point just above the convergent bottom wall 20. A continuation 41a of the pipeline 41 connects with a horizontal pipe 49 provided with a valve 50. A continuation 47a of the pipe 47 extends beyond the cross fitting 46 and is provided with a valve 51.

Through the lower convergent end 21 of the sump chamber 22 is secured a cross fitting 52, into one horizontal branch of which is threaded the end of the pipe 49 and into the other horizontal branch of which extends a steam pipe 53 having a control valve 54. A second steam pipe 55 extends vertically upwardly through the fitting 52 to terminate in a nozzle 56 within the inverted funnel member 27 and in slightly spaced relation to the bottom of the basket 23. Said steam pipe 55 is controlled by means of a valve 57.

In operation, the upper closure member 12 is first removed and the tank charged with the material to be melted, which, for the purposes of description, will be referred to as oleoresin. The solid, or semi-solid oleoresin, is charged into the tank 10 to rest upon the basket 23 and substantially fill the tank up to the reduced neck portion 11. The cover is then fastened in place by means of the swinging bolts 13 and steam is admitted into the coils 29 and 33 through the respective inlets 31 and 35. As the oleoresin becomes heated, some of the material melts and passes downwardly through the mesh of the basket 23 into the sump 22, any larger foreign impurities being retained in the basket. With the valves 50 and 54 closed, steam may be admitted through the pipe 55 and open valve 57 for discharge through the nozzle 56 into the contents of the basket 23. Owing to the fact that the discharge from the jet 56 occurs adjacent the reduced neck of the inverted funnel member 27, portions of the liquid charge within the sump 22 will be inducted into the high velocity stream of steam and forced in a highly heated condition through the contents of the basket 23 to aid in the melting of any unmelted portion of the charge therein.

As a further aid to rapid melting of the entire charge, molten portions of the charge above the basket 23 are withdrawn through the filter medium 38 and the strainer pipe 37 by the action of the steam discharged into the vertical pipe 41 through the steam pipe 43 and valve 44. With the valves 42 and 48 open, and the valves 51 and 50 closed, the action of the jet of steam issuing from the pipe 43 into the T fitting 40 results in a rapid circulation of the molten portion withdrawn through the strainer 38 and pipe 37. These molten portions are discharged into the lower portion of the tank through the pipe 47 and, owing to their highly heated condition, spread upwardly over the heating coils 29 and circulate back through the meshes of the basket 23 into the upper portion of the tank, where they serve to melt down any unmelted portions of the charge in the upper portion of the tank. The steam jets provided by the steam pipes 43 and 55 may be operated either simultaneously or in either sequence, and the operation of the jets continued until the entire charge is melted.

Upon complete melting of the charge, the steam is shut off from the jets 45 and 56 and the molten charge allowed to stand for a sufficient period to enable finely divided solid impurities to settle into the bottom of the sump 22. Larger solid impurities, incapable of passing through the mesh of the basket 23, are, of course, retained within said basket.

At this point of the operation, the charge comprises melted oleoresin in a highly fluid state and a certain amount of water condensate, resulting from the live steam directly injected into the mass through the steam jets 45 and 56. It might be explained that during the introduction of steam through said jets, the release valve 17 is set at a lower pressure than the steam jets so as to prevent an excess pressure from building up within the tank. Some steam, water vapor and vapor of spirits of turpentine are vented through the release valve 17 during the steaming operation. The spirits of turpentine may be recovered from the portion so vented in any suitable manner.

When the contents of the tank are ready to be discharged for further processing, steam is admitted into the top through the steam pipe 18 and pipe 15 to create a pressure upon the top of the melted charge, while the valves 48 and 51 are opened and the valves 42 and 50 are closed. This permits the molten contents of the tank to be discharged through the pipes 47 and 47a. Since said pipes 47 and 47a enter the tank 10 at a point substantially above the sump chamber 22, the molten contents of the tank so discharged through these pipes are substantially free from settlable solids.

After the tank has been discharged down to the level of the pipe 47, the valve 48 is closed and the valve 50 is opened, and steam admitted through the pipeline 53 and valve 54 to discharge the remaining contents of the tank within the sump chamber 22. Such remaining portion of the tank contents contains the finely divided settlable foreign solids but is free from the larger solid impurities, such as trash, which are retained within the basket 23. The contents of the sump may thus be passed through the same filters that are used to filter the cleaner oleoresins, but subsequent to the filtration of the cleaner portions of the charge, so as to avoid clogging of the filters.

It will thus be seen that I have provided a melting tank having indirect heating elements and direct steam jets so arranged as to effect a rapid melting of materials charged into the tank. At the same time, the tank is so proportioned and the outlet piping therefrom so arranged at different levels that the molten contents of the tank can be removed in stages, whereby cleaner portions of the melted charge can be filtered first and the capacity of the filters thereby greatly increased.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A melting tank comprising a container, a perforated charge supporting member in the lower portion thereof but spaced from the bottom of said container, heating means adjacent said member, a vertical strainer element positioned within the upper portion of said tank and means for withdrawing liquid portions from said tank through said strainer element and injecting said portions back into said tank for upward circulation past said heating means.

2. A melting tank comprising a heated container having a lower sump chamber, a perforated charge retaining member above said sump chamber, pipe connections into said sump chamber and into said container above said sump chamber, a strainer element positioned above said perforated member and valve connected to each of said pipe connections and a steam jet arranged to effect circulation of melted material withdrawn through said strainer into one of said pipe connections and upwardly through said perforated member and any unmelted portion of the charge thereof to aid in melting the same.

3. A melting tank comprising a heated container having a lower sump chamber, a perforated charge retaining member above said sump chamber, pipe connections into said sump chamber and into said container above said sump chamber, a strainer element positioned above said perforated member and valve connected to each of said pipe connections, a steam jet extending through said sump pipe connection for discharging steam through said perforated member and a steam jet arranged to effect circulation of melted material withdrawn through said strainer into the other of said pipe connections and upwardly through said perforated member and any unmelted portion of the charge thereof to aid in melting the same.

4. A melting tank comprising a relatively tall narrow cylindrical container having a convergent lower portion terminating in a sump chamber, a perforated basket supported in spaced relation above said convergent portion, indirect heating means positioned between said basket and the adjacent container walls and means for withdrawing melted portions of a charge within said container from a point above said basket and recirculating said portions around said heating means and back up through said basket.

5. A melting tank comprising a relatively tall narrow cylindrical container having a convergent lower portion terminating in a sump chamber, a perforated basket supported in spaced relation above said convergent portion, indirect heating means positioned between said basket and the adjacent container walls, means for withdrawing melted portions of a charge within said container from a point above said basket and recirculating said portions around said heating means and back up through said basket and other means for heating and inducting portions of molten material from said sump chamber and discharging said portions upwardly through the contents of said basket.

6. A melting tank comprising a relatively tall narrow cylindrical container having a convergent lower portion terminating in a sump chamber, a perforated basket supported in spaced relation above said convergent portion, indirect heating means positioned between said basket and the adjacent container walls, means including a strainer in the upper part of said container and a steam jet for withdrawing melted portions of a charge within said container from a point above said basket and recirculating said portions around said heating means and back up through said basket and other means for heating and inducting portions of molten material from said sump chamber and discharging said portions upwardly through the contents of said basket.

7. A melting tank comprising a relatively tall narrow cylindrical container having a convergent lower portion terminating in a sump chamber, a perforated basket supported in spaced relation above said convergent portion, indirect heating means positioned between said basket and the adjacent container walls, an elongated vertical strainer element in the upper part of said container having a lower filtrate outlet, a pipe connection from said filtrate outlet leading outside of said container and opening thereinto adjacent said basket, and steam jet means for discharging steam into said pipe to heat and circulate filtrate from said strainer element.

8. A melting tank comprising a relatively tall narrow cylindrical container having a convergent lower portion terminating in a sump chamber, a perforated basket supported in spaced relation above said convergent portion, indirect heating means positioned between said basket and the adjacent container walls, an elongated vertical strainer element in the upper part of said container having a lower filtrate outlet, a pipe connection from said filtrate outlet leading outside of said container and opening thereinto adjacent said basket, steam jet means for discharging steam into said pipe to heat and circulate filtrate from said strainer element and other steam jet means entering said sump chamber for discharging steam upwardly through said basket to heat the contents thereof.

9. A melting tank comprising a tall cylindrical container having a lower sump chamber, a perforated charge retaining member above said sump chamber, heating means adjacent said retaining member, an elongated strainer element in the upper part of said container, a pipe from said strainer element extending outside of said container and opening into said container at points above said sump chamber and at the bottom of said chamber, and a steam jet for discharging steam into said pipe to heat and circulate melted portions of charge drawn through said strainer element.

10. A melting tank comprising a tall cylindrical container having a lower sump chamber, a perforated charge retaining member above said sump chamber, heating means adjacent said retaining member, an elongated strainer element in the upper part of said container, a pipe from said strainer element extending outside of said container and opening into said container at points above said sump chamber and at the bottom of said chamber, a steam jet for discharging steam into said pipe to heat and circulate melted portions of charge drawn through said strainer element and a second steam jet extending vertically upward through said sump chamber to discharge steam into the portion of the charge above said perforated member.

11. In a melting tank having a perforate charge retaining barrier in the lower portion thereof, means for withdrawing molten portions of the charge from a point above said barrier, and a heating fluid operated jet means for heating and recirculating said withdrawn portions through said barrier up through the unmelted portions of the charge thereabove.

12. In a melting tank having a perforate charge retaining barrier in the lower portion thereof, means for withdrawing molten portions of the charge from a point above said barrier, heating and recirculating said withdrawn portions through said barrier up through the unmelted portions of the charge thereabove, said means comprising an elongated strainer element in the upper portion of said tank, a valve controlled pipe from the lower end of said element opening into said tank below said barrier and a steam jet arranged to discharge steam into said pipe to set up forced circulation therethrough.

JAMES W. TAYLOR.